(12) United States Patent
Karpuška

(10) Patent No.: US 12,149,498 B2
(45) Date of Patent: *Nov. 19, 2024

(54) UPDATING MESHNET INTERNET PROTOCOL MAPS IN A MESH NETWORK

(71) Applicant: UAB 360 IT, Vilnius (LT)

(72) Inventor: Rytis Karpuška, Vilniaus r. (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,380

(22) Filed: May 25, 2022

(65) Prior Publication Data

US 2023/0388182 A1  Nov. 30, 2023

Related U.S. Application Data

(63) Continuation of application No. 17/752,788, filed on May 24, 2022, now Pat. No. 11,646,992.

(51) Int. Cl.
| | |
|---|---|
| *H04L 61/2503* | (2022.01) |
| *H04L 41/0816* | (2022.01) |
| *H04L 41/0823* | (2022.01) |
| *H04L 41/12* | (2022.01) |
| *H04L 45/74* | (2022.01) |
| *H04L 61/2514* | (2022.01) |
| *H04L 61/4511* | (2022.01) |
| *H04L 67/12* | (2022.01) |

(52) U.S. Cl.
CPC ...... *H04L 61/2503* (2013.01); *H04L 41/0816* (2013.01); *H04L 41/0836* (2013.01); *H04L 41/12* (2013.01); *H04L 45/74* (2013.01); *H04L 61/2514* (2013.01); *H04L 67/12* (2013.01); *H04L 61/4511* (2022.05)

(58) Field of Classification Search
CPC ...... H04L 61/2503; H04L 45/74; H04L 67/12
USPC ........ 709/220–224, 227–228, 238–240, 242, 709/245
See application file for complete search history.

(56) References Cited

U.S. PATENT DOCUMENTS

| | | | | |
|---|---|---|---|---|
| 2006/0114881 | A1* | 6/2006 | Chari | H04W 88/04 370/351 |
| 2006/0268766 | A1* | 11/2006 | Rangarajan | H04W 8/26 370/406 |
| 2008/0183853 | A1* | 7/2008 | Manion | H04L 67/1093 709/223 |
| 2013/0086245 | A1* | 4/2013 | Lu | H04L 12/66 709/250 |
| 2013/0287028 | A1* | 10/2013 | Ashwood-Smith | H04L 45/74 370/392 |

(Continued)

OTHER PUBLICATIONS

Liu et al., "MagicBox: An intelligent caching-enabled mobile router/server", Jul. 1, 2015, IEEE, 2015 IEEE 16th International Conference on High Performance Switching and Routing (HPSR) (2015, pp. 1-3) (Year: 2015).*

*Primary Examiner* — Davoud A Zand

(74) *Attorney, Agent, or Firm* — The Pattani Law Group

(57) ABSTRACT

A method including receiving, by a first device in communication with a second device in a mesh network, communication information indicating a meshnet address associated with the second device to be utilized for communicating meshnet data with the second device; and updating, by the first device, a meshnet address map to indicate an association of the second user device with the meshnet address. Various other aspects are contemplated.

20 Claims, 7 Drawing Sheets

100

(56) References Cited

U.S. PATENT DOCUMENTS

| | | | |
|---|---|---|---|
| 2015/0249599 A1* | 9/2015 | Song | H04L 45/46 709/226 |
| 2017/0135033 A1* | 5/2017 | Vecera | H04W 72/542 |
| 2019/0090176 A1* | 3/2019 | Peters | H04L 41/0859 |
| 2020/0077892 A1* | 3/2020 | Tran | G08B 21/02 |
| 2020/0322871 A1* | 10/2020 | Ernst | H04W 48/16 |

* cited by examiner

UPDATING MESHNET INTERNET PROTOCOL MAPS IN A MESH NETWORK

CROSS REFERENCE

This application is a continuation of U.S. Non-Provisional patent application Ser. No. 17/752,788, filed on May 24, 2022, and titled "Updating Meshnet Internet Protocol Maps In A Mesh Network," the entire contents of which are incorporated herein by reference.

FIELD OF DISCLOSURE

Aspects of the present disclosure generally relate to communications in networks, and more particularly to updating meshnet internet protocol (IP) maps in a mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method including determining, by a first device in a mesh network, that a second device has joined the mesh network; transmitting, by the first device based at least in part on determining that the second device has joined the mesh network, a request to receive communication information indicating a meshnet address associated with the second device; updating, by the first device based at least in part on receiving the meshnet address, a meshnet address map to indicate an association of the second device with the meshnet address; and transmitting, by the first device based at least in part on updating the meshnet address map, meshnet data to the second device utilizing the updated meshnet address map.

In another aspect, the present disclosure contemplates a first device including a memory and a processor configured to: determine, while in communication with a second device in a mesh network, that a second device has joined the mesh network; transmit, based at least in part on determining that the second device has joined the mesh network, a request to receive communication information indicating a meshnet address associated with the second device; update, based at least in part on receiving the meshnet address, a meshnet address map to indicate an association of the second device with the meshnet address; and transmit, based at least in part on updating the meshnet address map, meshnet data to the second device utilizing the updated meshnet address map.

In another aspect, the present disclosure contemplates a non-transitory computer readable medium storing instructions, which when executed by a processor associated with a first device, cause the processor to: determine, while in communication with a second device in a mesh network, that a second device has joined the mesh network; transmit, based at least in part on determining that the second device has joined the mesh network, a request to receive communication information indicating a meshnet address associated with the second device; update, based at least in part on receiving the meshnet address, a meshnet address map to indicate an association of the second device with the meshnet address; and transmit, based at least in part on updating the meshnet address map, meshnet data to the second device utilizing the updated meshnet address map.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
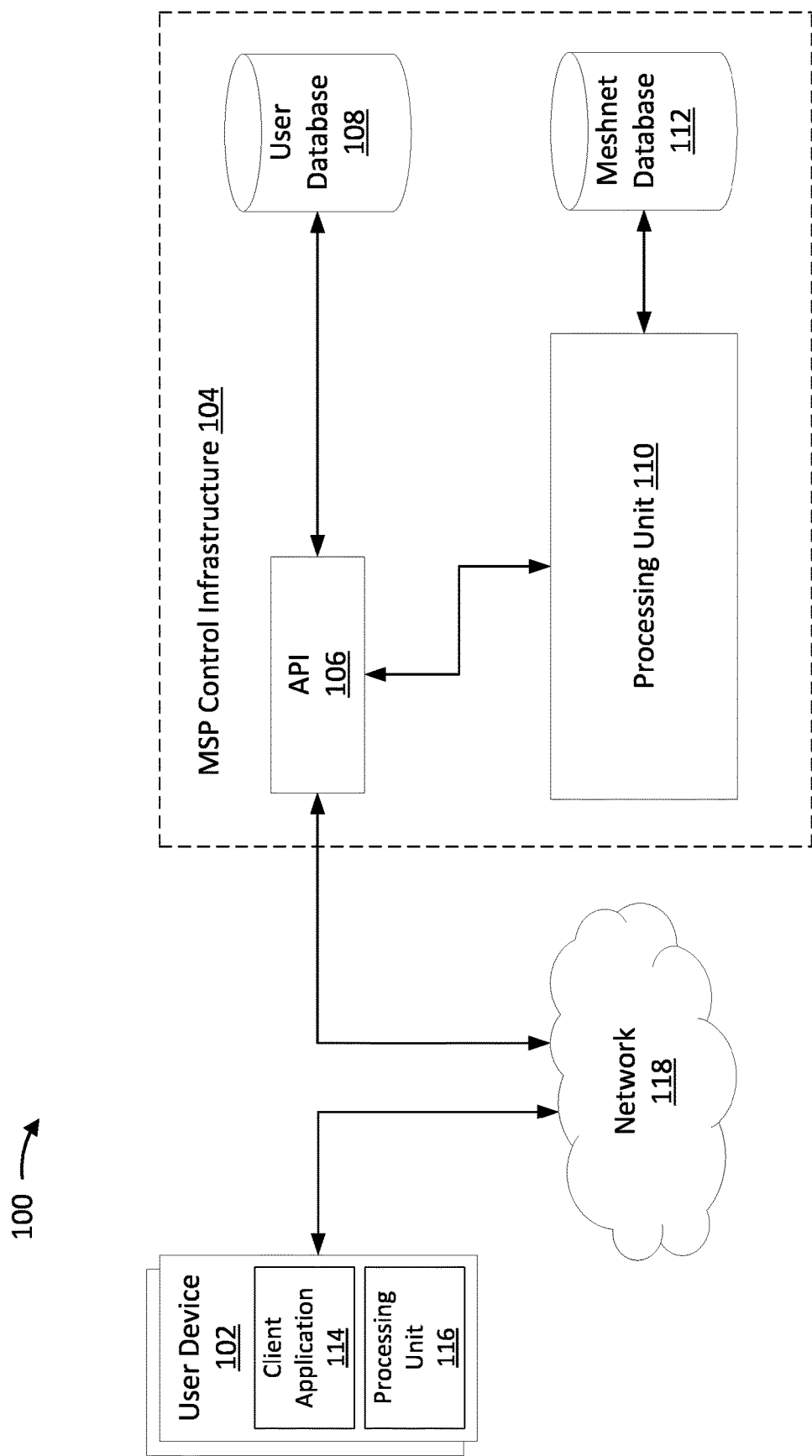

FIG. 1 is an illustration of an example system associated with updating meshnet IP maps in a mesh network, according to various aspects of the present disclosure.

Figure 2:
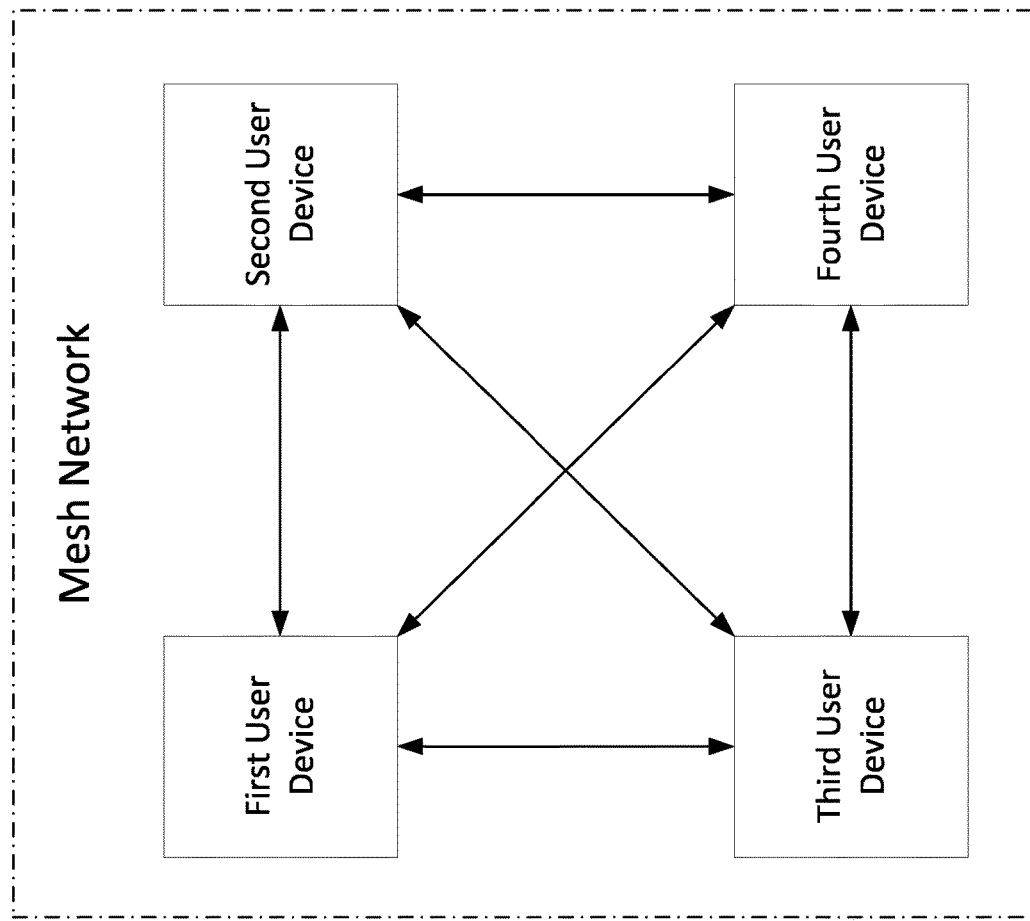

FIG. 2 is an illustration of an example associated with updating meshnet IP maps in a mesh network, according to various aspects of the present disclosure.

Figure 3:
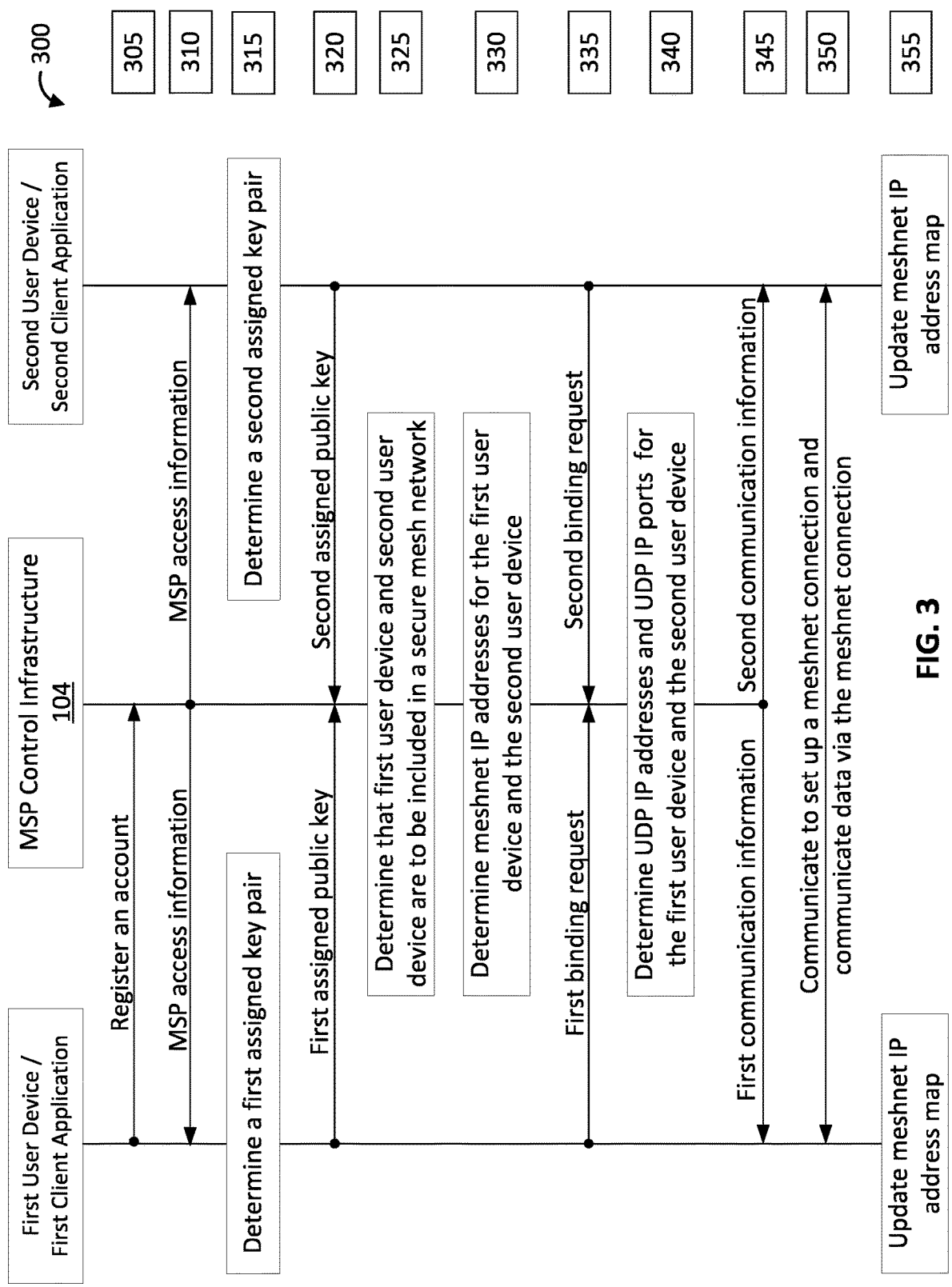

FIG. 3 is an illustration of an example flow associated with updating meshnet IP maps in a mesh network, according to various aspects of the present disclosure.

Figure 4:
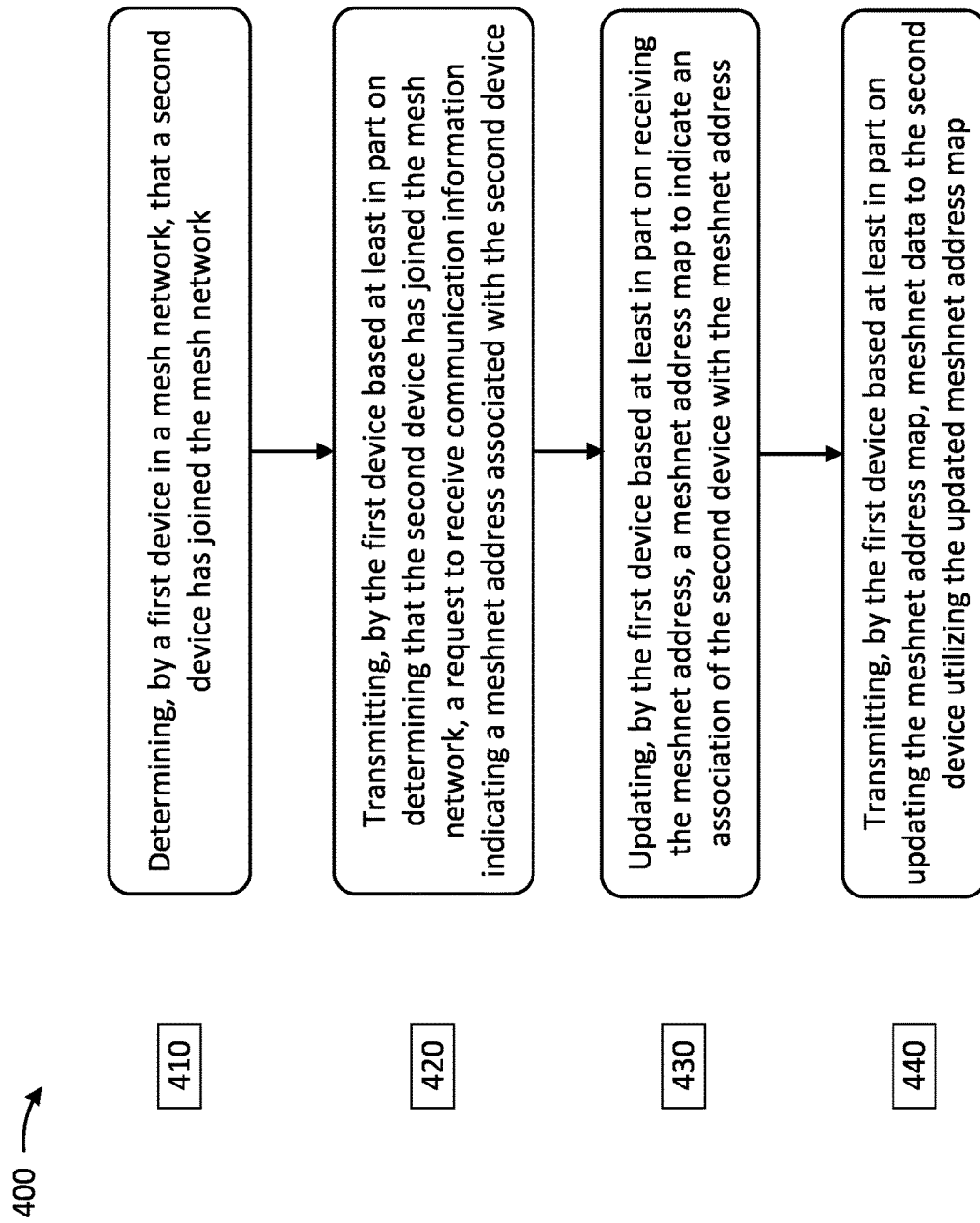

FIG. 4 is an illustration of an example process associated with updating meshnet IP maps in a mesh network, according to various aspects of the present disclosure.

Figure 5:
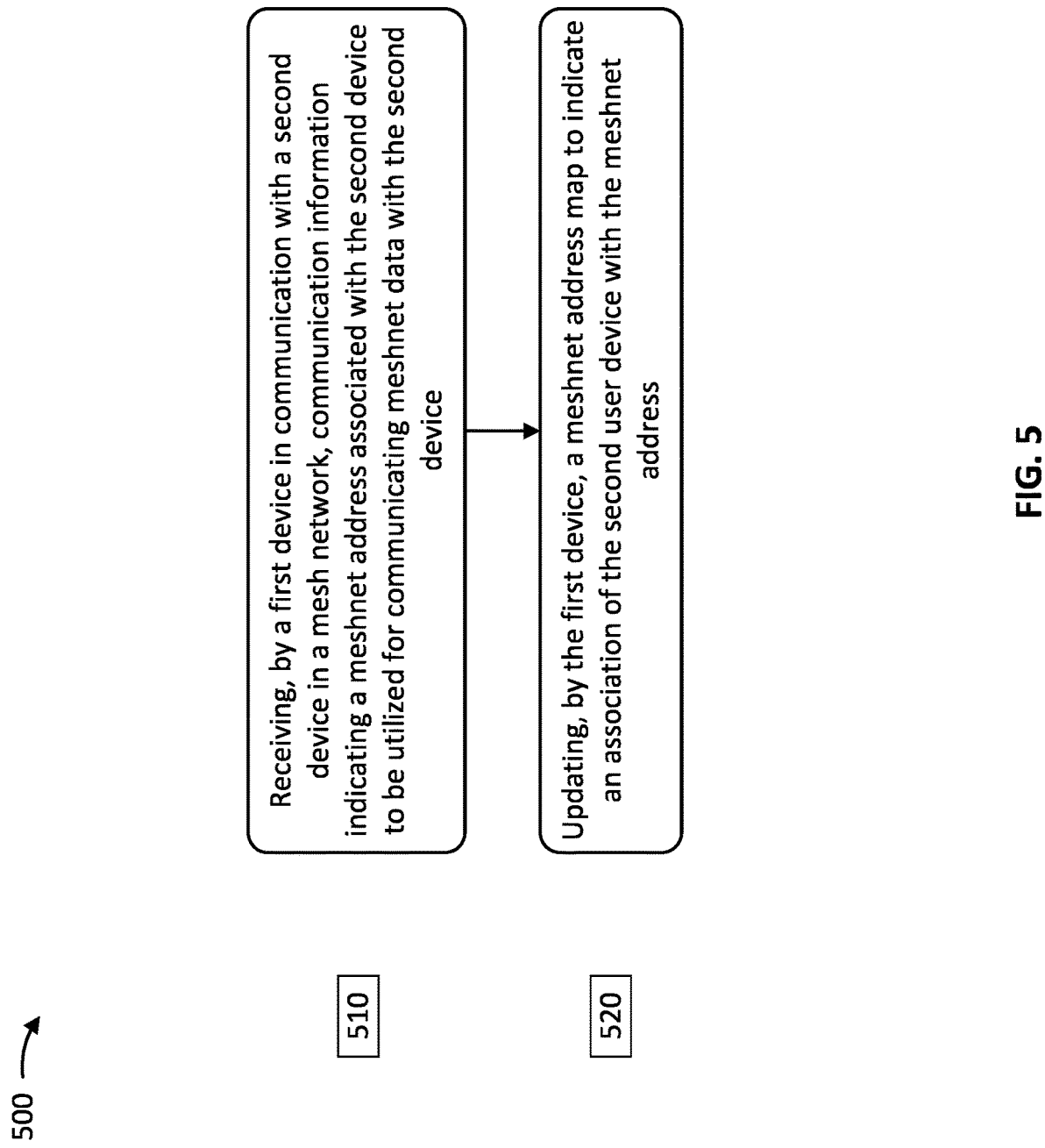

FIG. 5 is an illustration of an example process associated with updating meshnet IP maps in a mesh network, according to various aspects of the present disclosure.

Figure 6:
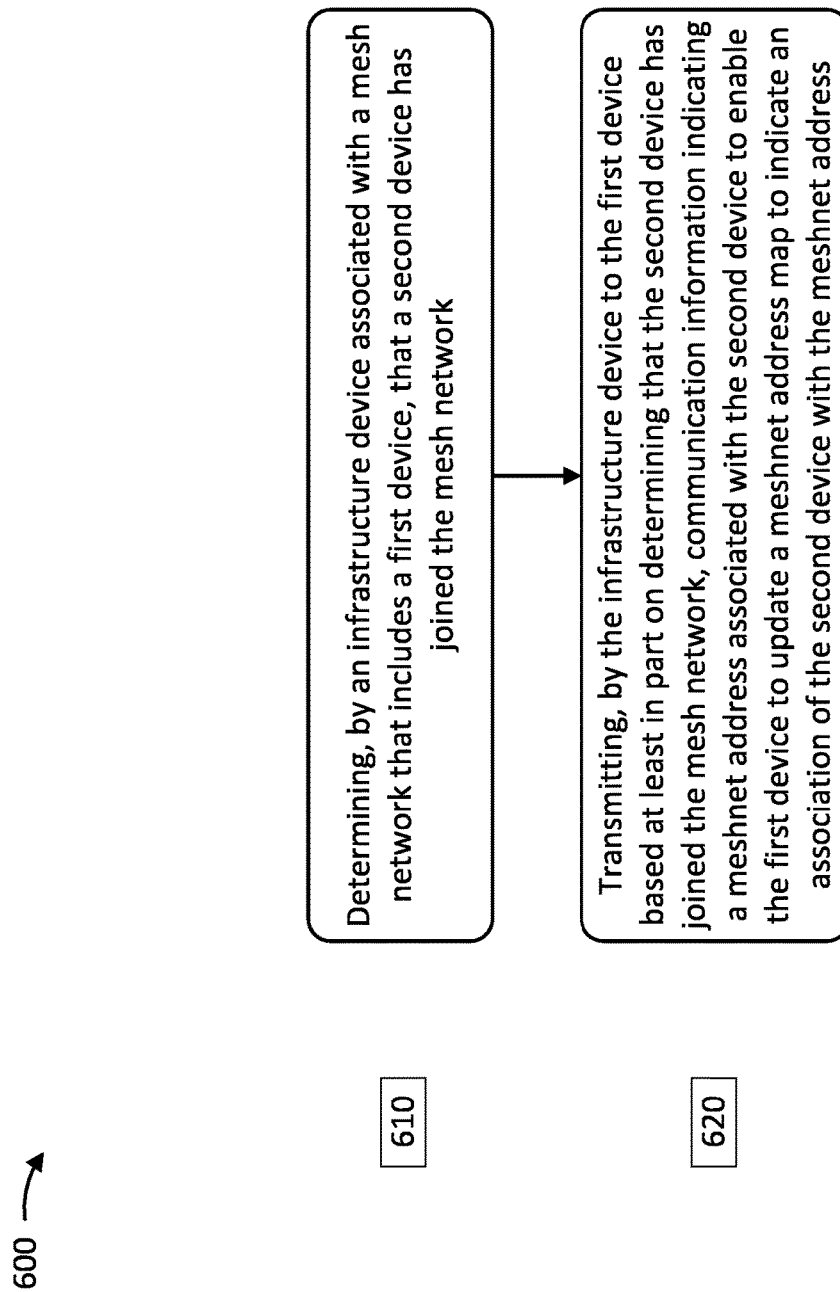

FIG. 6 is an illustration of an example process associated with updating meshnet IP maps in a mesh network, according to various aspects of the present disclosure.

Figure 7:
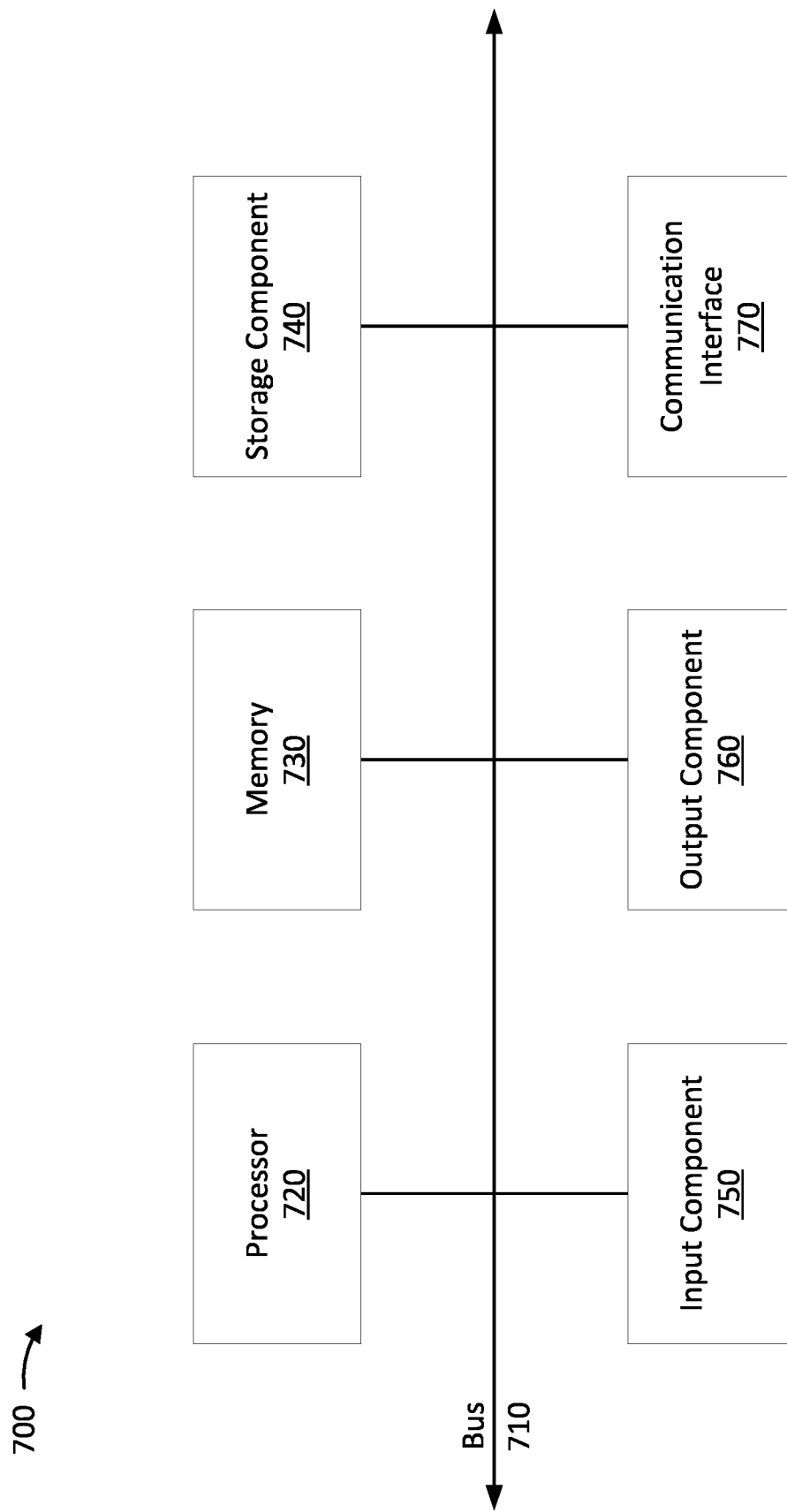

FIG. 7 is an illustration of example devices associated with updating meshnet IP maps in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with updating meshnet IP maps in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more networks such as, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the MSP control infrastructure 104 may be separate and distinct from each other. Alternatively, in some aspects, the one or more of the components included in the MSP control infrastructure 104 may be combined with one or more of the other components. In some aspects, the one or more of the components included in the MSP control infrastructure 104 and/or the user device 102 may be local with respect to each other. Alternatively, in some aspects, one or more of the components included in the MSP control infrastructure 104 and/or the user device 102 may be located remotely with respect to one or more of other components included in the MSP control infrastructure 104 and/or the user device 102. Additionally, or alternatively, one or more components of the components included in the MSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

Endpoints (e.g., user devices) may rely on a mesh network to communicate (e.g., transmit and/or receive) meshnet data among the endpoints. In example 200 shown in FIG. 2, the endpoints may include a first user device, a second user device, a third user device, and/or a fourth user device. The meshnet data may be communicated using wired communications and/or wireless communications over a network such as, for example, the Internet. The meshnet data may include any information including digital information such as, for example, documents including data, voice data, image data, signal data, and/or video data. Further, the internal mesh network may be a secure mesh network that may enable the endpoints to communicate the meshnet data in encrypted form via meshnet connections (shown as double-ended arrows in FIG. 2).

The endpoints may utilize meshnet IP addresses to communicate the meshnet data. In an example, the first user device may transmit a first meshnet IP packet to the second user device. The first meshnet IP packet may indicate a first meshnet IP address associated with the first user device as a source meshnet IP address and a second meshnet IP address associated with the second user device as a destination meshnet IP address. Similarly, the first user device may receive a second meshnet packet from the second user device. The second meshnet IP packet may indicate the second meshnet IP address as the source meshnet IP address and the first meshnet IP address as the destination meshnet IP address.

All endpoints in the mesh network may refer to a meshnet IP address map to determine meshnet IP addresses associated with other endpoints in the mesh network to enable communication of meshnet data. In an example, the first user device may refer to a first meshnet IP address map associated with the first user device that indicates an association of the second user device with the second meshnet IP address (and associations of other endpoints in the mesh network with respective meshnet IP addresses), the second user device may refer to a second meshnet IP address map associated with the second user device that indicates an association of the first user device with the first meshnet IP address (and associations of other endpoints in the mesh network with respective meshnet IP addresses), and so on.

A meshnet IP address may be assigned to a given endpoint when the given endpoint first joins the mesh network. In some cases, such assignment of the meshnet IP address to the given endpoint may be permanent such that the assigned meshnet IP address may not be assigned to another endpoint. In an example, the first meshnet IP address may be permanently assigned to the first user device such that the first IP address may not be assigned to another endpoint, the second meshnet IP address may be permanently assigned to the second user device such that the second IP address may not be assigned to another endpoint, and so on.

The permanent assignment of meshnet IP addresses may be infeasible because a limited amount of meshnet IP addresses may be available for assignment, leaving fewer and fewer meshnet IP addresses available for endpoints that additionally join the mesh network. At some stage, no meshnet IP address may remain available for assignment. Further, the permanent assignment of meshnet IP addresses may be inefficient and/or wasteful because a given endpoint may join the mesh network to complete a given task, and upon completion of the given task, the given endpoint may leave the mesh network without joining the mesh network again. In this case, a meshnet IP address permanently assigned to the given endpoint may remain underutilized.

To avoid the infeasibility and/or inefficiency associated with permanent assignment of meshnet IP addresses, the meshnet IP addresses may be temporarily assigned based at least in part on an endpoint joining and/or leaving the mesh network. In an example, an original meshnet IP address may be temporarily assigned to the second user device based at least in part on the second user device first joining the mesh network. Further, the original meshnet IP address may be unassigned (e.g., disassociated) from the second user device based at least in part on the second user device leaving the mesh network such that the original meshnet IP address is available for reassignment to another user device. When the second user device rejoins the mesh network, a new meshnet IP address is temporarily assigned to the second user device. In this case, when the second user device leaves and rejoins the mesh network such that the new meshnet IP address is assigned to the second user device, the second user device may utilize the new meshnet IP address to communicate meshnet data in the mesh network.

The first user device may, however, fail to communicate meshnet data with the second user device. For instance, when the second user device first joins the mesh network and is assigned to the original meshnet IP address, the first user device may receive communication information indicating the association of the second user device with the original meshnet IP address. The first user device may store the association of the second user device with the original meshnet IP address in the first meshnet IP address map associated with the first user device.

When determining the meshnet IP packet for transmission to the second user device, the first user device may refer to the first meshnet IP address map that indicates the association of the second user device with the original meshnet IP address. As such, the first user device may transmit the first meshnet IP packet to the original meshnet IP address as the destination address. A client application associated with the second user device responsible for processing meshnet IP packets (e.g., meshnet data) may drop the first meshnet IP packet because the destination address is different from the new meshnet IP address.

As a result, the first user device (and other endpoints in the mesh network) may fail to communicate meshnet data with the second user device, and communication between an endpoint and the second user device may be interrupted. Further, the first user device and/or the other endpoints in the mesh network may retransmit the meshnet data to ensure receipt thereof by the second user device. Such transmission and retransmission of meshnet data may inefficiently consume user device resources (e.g., processing resources, memory resources, power consumption resources, battery life, or the like) and network resources (computational resources, network bandwidth, management resources, processing resources, memory resources, or the like) that can otherwise be utilized to perform suitable tasks associated with the mesh network. The above discussion with respect to the first user device and/or the second user device may also apply to the one or more other user devices in the mesh network.

Various aspects of systems and techniques discussed in the present disclosure enable updating meshnet IP maps in a mesh network. In some aspects, an MSP control infrastructure may provide the mesh network to enable endpoints to securely communicate meshnet data. Further, the MSP control infrastructure may provide the endpoints with respective client applications to communicate with the MSP control infrastructure, to communicate with each other for setting up respective meshnet connections to be utilized for communicating meshnet data in the mesh network, and/or to communicate the meshnet data (e.g., meshnet communications) with each other over the respective meshnet connections. The MSP control infrastructure and the respective client applications may also enable updating meshnet IP maps in the mesh network. In some aspects, a first client application associated with the first user device may update a first meshnet IP address map associated with the first user device. In some aspects, the first meshnet IP address map may be updated based at least in part on determining that a given endpoint (e.g., user device) has joined the mesh network. In an example, the given endpoint may have joined the mesh network for the first time. In another example, the given endpoint may have rejoined the mesh network after being disconnected from the mesh network (e.g., after leaving the mesh network). Based at least in part on determining that the given endpoint has joined or rejoined the mesh network, the first user device may transmit a request to receive communication information indicating an association of the given endpoint with an assigned meshnet IP address. In some aspects, the first meshnet IP address map may be updated based at least in part on receiving communication information indicating that the given endpoint has joined the mesh network and/or the association of the given endpoint with an assigned meshnet IP address. In this way, the first user device may utilize the currently assigned meshnet IP address to communicate with the given endpoint, and communication between the first user device and the other endpoint may continue uninterrupted. Further, instances of inefficient transmissions and retransmissions of communications by the first user device (and other endpoints in the mesh network) to the given endpoint may be mitigated. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the mesh network.

In some aspects, a processor (e.g., processing unit 116, processor 720) associated with a user device may determine, while in communication with a second device and/or in communication with an MSP control infrastructure in a mesh network, that a second device has joined the mesh network; transmit, based at least in part on determining that the second device has joined the mesh network, a request to receive communication information indicating a meshnet address associated with the second device; update, based at least in part on receiving the meshnet address, a meshnet address map to indicate an association of the second device with the meshnet address; and transmit, based at least in part on updating the meshnet address map, meshnet data to the second device utilizing the updated meshnet address map.

As indicated above, FIG. 2 is provided as an example. Other examples may differ from what is described with regard to FIG. 2.

FIG. 3 is an illustration of an example flow 300 associated with updating meshnet IP maps in a mesh network, according to various aspects of the present disclosure. The example flow 300 may include a first user device (e.g., first endpoint), MSP control infrastructure 104, and a second user device (e.g., second endpoint) in communication with each other. The first user device and the second user device may be similar to a user device 102 discussed above with respect to FIG. 1. In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other.

The first user device may install a first client application (e.g., client application 104) and the second user device may install a second client application (e.g., client application 104), the first client application and the second client application being associated with (e.g., provided by) the MSP control infrastructure 104. The first user device and the second user device may use the respective client applications to communicate with an application programming interface (API) and/or a processor (e.g., processing unit 110, processor 720) associated with the MSP control infrastructure 104. In some aspects, the first user device, the MSP control infrastructure 104, and the second user device may communicate with each other over a network (e.g., network 118). As discussed elsewhere herein, the MSP control infrastructure 104 may enable the first user device and/or the second user device to obtain the mesh network services.

In some aspects, the client applications may enable the user devices to receive information to be processed by the client applications and/or by the MSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the information to the MSP control infrastructure 104. In some aspects, the first client application may utilize a first processing unit (e.g., processing unit 116, processor 720) associated with the first user device to perform processes/operations associated with obtaining the mesh network services and the second application may utilize a second processing unit (e.g., processing unit 116, processor 720) associated with the second user device to perform processes/operations associated with obtaining the mesh network services.

Although only two user devices (e.g., endpoints) are shown in FIG. 3, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Further, user devices may leave or join the mesh network in an ad-hoc manner.

As shown by reference numeral 305, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device is not associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 310, based at least in part on the first user device and the second user device accessing the registered account/accounts to communicate with the MSP control infrastructure 104, the MSP control infrastructure 104 may transmit, and the first client application and the second client application may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate with the MSP control infrastructure 104 regarding the mesh network. Further, the first client application and the second client application may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first client application and the second client application may determine information based at least in part on the registration of the account/accounts with the MSP Control Infrastructure 104. In an example, the first client application may determine an asymmetric first assigned key pair associated with the first user device. The first assigned key pair may be unique to the first user device and may include a first assigned public key and a first assigned private key. In this way, the first assigned public key and the first assigned private key may be device-specific and may be associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine an asymmetric second assigned key pair associated with the second user device. The second assigned key pair may be unique to the second user device and may include a second assigned public key and a second assigned private key. In this way, the second assigned public key and the second assigned private key may be device-specific and may be associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the client applications may transmit, and the MSP control infrastructure 104 may receive, at least a portion of the information determined by the client applications. For instance, the first client application may transmit, for example, the first assigned public key to the MSP control infrastructure 104 and the second client application may transmit, for example, the second assigned public key to the MSP control infrastructure 104. The MSP control infrastructure 104 may store and correlate the received information in association with the registered account and/or with the respective user devices. In an example, the MSP control infrastructure 104 may store and correlate the first assigned public key in association with the registered account and the first user device, and may store and correlate the second assigned public key in association with the registered account and the second user device. In some aspects, the first client application and the second client application may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (and/or the second user device) providing information indicating that the first user device and the second user device are to be included in the same mesh network. Such information may include, for example, identification information (e.g., type of device, user name, email address, etc.) associated with the second user device (or the first user device), the second IP address (or the first IP address), or the like.

Based at least in part on determining that the first user device and the second user device are to be included in the same mesh network, as shown by reference numeral 330, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. The first client application and/or another application installed on the first user device and/or the operating system associated with the first user device may utilize the first meshnet IP address and/or the first local meshnet port to communicate data with the endpoints over meshnet connections in the mesh network and the second user device may utilize the second meshnet IP address and/or the second local meshnet port to communicate data with the endpoints over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the first meshnet IP address and the second meshnet IP address from, for example, a pool of reserved IP addresses included in a subnet associated with an internal network of the ISP.

As shown by reference numeral 335, the first user device and the second user device may transmit, and the MSP control infrastructure 104 may receive, respective binding requests. In some aspects, the first user device may transmit the first binding request to the MSP control infrastructure 104 using the UDP by utilizing the UDP access information received from the MSP control infrastructure 104 (e.g., block 320). In this case, the first user device may transmit a first binding request to the MSP control infrastructure 104 to request the MSP control infrastructure 104 to determine a first public UDP IP address (e.g., communication address) and/or a first public UDP port (e.g., communication port) associated with the first user device. As discussed below in further detail, the first public UDP IP address and/or the first public UDP port are to be utilized by the second user device to communicate with the first user device in the mesh network. Similarly, the second user device may transmit the second binding request to the MSP control infrastructure 104 using the UDP by utilizing the UDP access information received from the MSP control infrastructure 104 (e.g., block 320). In this case, the second user device may transmit a second binding request to the MSP control infrastructure 104 to request the MSP control infrastructure 104 to determine a second public UDP IP address (e.g., communication address) and/or a second public UDP port (e.g., communication port) associated with the second user device. As discussed below in further detail, the second UDP IP address and/or the second UDP port are to be utilized by the first user device to communicate with the second user device in the mesh network.

In some aspects, the first public UDP IP address and/or the first public UDP port may be determined by a first NAT device (e.g., a router) responsible for managing operation of the first user device in a first local network. In an example, the first NAT device may translate a first local UDP IP address and/or a first local UDP port associated with the first user device to the first public UDP IP address and/or the first public UDP port that the first user device utilizes to communicate (e.g., transmit and/or receive) over the Internet using the UDP. Similarly, the second public UDP IP address and/or the second public UDP port may be determined by a second NAT device responsible for managing operation of the second user device in a second local network. In an example, the second NAT device may translate a second local UDP IP address and/or a second local UDP port associated with the second user device to the second public UDP IP address and/or the second public UDP port that the second user device utilized to communicate (e.g., transmit and/or receive) over the Internet using the UDP.

Based at least in part on receiving the respective binding requests, as shown by reference numeral 340, the MSP control infrastructure 104 may determine public UDP IP addresses and/or public UDP ports associated with the first user device and the second user device. In an example, based at least in part on receiving the first binding request, the MSP control infrastructure 104 may determine the first public UDP IP address and/or the first public UDP port associated with the first user device. In some aspects, the MSP control infrastructure 104 may determine the first public UDP IP address and/or the first public UDP port based at least in part on analyzing the UDP communication (e.g., UDP IP packet) including the first binding request received from the first user device. The UDP communication may include, for example, a header that indicates the first public UDP IP address as a source UDP IP address and/or the first public UDP port as a source UDP port associated with the first user device. Further, the MSP control infrastructure 104 may store and correlate the first public UDP IP address and/or the first UDP port in association with the first user device in, for example, the meshnet database 112. Similarly, based at least in part on receiving the second binding request, the MSP control infrastructure 104 may determine the second public UDP IP address and/or the second public UDP port associated with the second user device. In some aspects, the MSP control infrastructure 104 may determine the second public UDP IP address and/or the second public UDP port based at least in part on analyzing the UDP communication (e.g., UDP IP packet) including the second binding request received from the second user device. The UDP communication may include, for example, a header that indicates the second public UDP IP address as a source UDP IP address and/or the second public UDP port as a source UDP port associated with the second user device. Further, the MSP control infrastructure 104 may store and correlate the second public UDP IP address and/or the second public UDP port in association with the second user device in, for example, the meshnet database 112.

Based at least in part on determining the public UDP IP addresses and/or the public UDP ports, as shown by reference numeral 345, the MSP control infrastructure 104 may transmit, and the first client application and the second client application may receive, communication information. In an example, the MSP control infrastructure 104 may transmit, and the first client application may receive, first communication information including the first meshnet IP address associated with the first user device, the second meshnet IP address associated with the second user device, the second public UDP IP address and/or the second public UDP port associated with the second user device, and the second public key associated with the second user device. Similarly, the MSP control infrastructure 104 may transmit, and the second client application may receive, second communication information including the first public UDP IP address and/or the first public UDP port associated with the first user device, the first public key associated with the first user device, the first meshnet IP address associated with the first user device, and the second meshnet IP address associated with the second user device. As discussed below in further detail, the above transmission of communication information may enable the first user device and the second user device to communicate securely and privately in the mesh network.

As shown by reference numeral 350, the first client application and the second client application may communicate with each other directly to set up a meshnet connection (e.g., an encrypted tunnel) for communicating encrypted data in the mesh network. To set up the meshnet connection, the first client application may utilize the second assigned public key and/or the second public IP address (e.g., second UDP IP address) to securely (e.g., in encrypted form) communicate with the second client application, and the second client application may utilize the first assigned public key and/or the first public IP address (e.g., first UDP IP address) to securely communicate with the first client application. In some aspects, the first client application and the second client application may communicate to securely/ privately negotiate parameters (e.g., a symmetric encryption/decryption key) associated with the meshnet connection. In some aspects, the parameters may be randomly generated to provide optimized security to the communications. In an example, the first client application and the second client application may privately negotiate a randomly generated symmetric key that is to be utilized by the first client application and the second client application for encrypting and decrypting data communicated via the meshnet connection. The randomly generated symmetric key may be determined based at least in part on any combination of the first public key, the second public key, and/or randomly generated numbers. Additionally, the first client application and the second client application may utilize a secure protocol (e.g., Wireguard, IP sec, etc.) to communicate the data via the meshnet connection.

Additionally, or alternatively, the first client application and the second client application may communicate with each other indirectly via, for example, a relay device (e.g., a relay server) to set up the meshnet connection. In an example, the first client application may provide the first assigned public key to a relay server, which may store an association of the first assigned public key with the first client application. In some aspects, the association may include an association between the first assigned public key and a first communication connection between the relay server and the first client application. Similarly, the second client application may provide the second assigned public key to the relay server, which may store an association of the second assigned public key with the second client application. In some aspects, the association may include an association between the second assigned public key and a second communication connection between the relay server and the first client application. The relay server may rely on the stored associations of public keys and client applications to determine a destination of a received message. In some aspects, the relay server may include a network of relay servers that enable the first client application and the second client application to communicate with each other. In this case, the first client application and the second client application may provide the respective assigned public keys to different relay servers included within the network of relay servers.

In some aspects, the first client application may transmit, to the relay server, a first message that is to be delivered to the second client application. Along with the first message, the first client application may transmit the second assigned public key. Further, the first client application may encrypt the first message utilizing the second assigned public key. In some aspects, the first client application may encrypt the first message based at least in part on utilizing the negotiated randomly generated symmetric key. Based at least in part on receiving the encrypted first message and the second assigned public key, the relay server may determine from stored associations that the second assigned public key is associated with the second client application. As a result, the relay server may determine that the first message is to be relayed (e.g., transmitted) to the second client application. Similarly, the second client application may transmit, to the relay server, a second message that is to be delivered to the first client application. Along with the second message, the second client application may transmit the first assigned public key. Further, the second client application may encrypt the second message utilizing the first assigned public key. In some aspects, the second client application may encrypt the second message based at least in part on utilizing the negotiated randomly generated symmetric key. Based at least in part on receiving the encrypted second message and the first assigned public key, the relay server may determine from stored associations that the first assigned public key is associated with the first client application. As a result, the relay server may determine that the second message is to be relayed (e.g., transmitted) to the first client application. In this way, the relay server may enable the first client application and the second client application to communicate with each other to set up the meshnet connection.

Based at least in part on setting up the meshnet connection, the first client application and the second client application may begin communicating encrypted data via the meshnet connection based at least in part on utilizing the negotiated parameters and the secure protocol. In a similar and/or analogous manner, the first client application may set up meshnet connections with a third client application installed in the third client application and with a fourth client application associated with the fourth client application. Also, in a similar and/or analogous manner, the second client application may set up meshnet connections with the first client application, the third client application, and the fourth client application. Further, in a similar and/or analogous manner, the third client application may set up meshnet connections with the first client application, the second client application, and the fourth client application. Finally, in a similar and/or analogous manner, the fourth client application may set up meshnet connections with the first client application, the second client application, and the third client application. Additional client applications that enter the mesh network may also set up meshnet connections with the other client applications included in the mesh network.

Further, based at least in part on setting up the meshnet connection, as shown by reference numeral 355, the first user device and/or the second user device may update respective meshnet IP address maps.

With respect to the first user device, the first client application may be associated with a first meshnet IP address map. In some aspects, the first meshnet IP address map may be maintained (e.g., stored and/or updated) by the first client application and may be stored in an electronic memory (e.g., storage component 740) associated with the first user device. As discussed above with respect to block 345, based at least in part on the MSP control infrastructure determining that a given user device (e.g., second user device, third user device, fourth user device, etc.) is to be included in the mesh network, the first user device may receive communication information indicating a given original meshnet IP address associated with the given user device. The first client application may store an association of the given user device with the given original meshnet IP address in the first meshnet IP address map. In an example, based at least in part on the MSP control infrastructure determining that the second user device, the third user device, and/or the fourth user device are to be included in the mesh network, the first user device may receive communication information indicating respective original meshnet IP addresses associated with the second user device, the third user device, and/or the fourth user device. Further, the first client application may store an association of the second user device with the original second meshnet IP address in the first meshnet IP address map, an association of the third user device with the original third meshnet IP address in the first meshnet IP address map, and/or an association of the fourth user device with the original fourth meshnet IP address in the first meshnet IP address map.

When a communication application (e.g., the first client application and/or another third-party application) associated with the first user device is to communicate meshnet data with, for example, the second user device, the communication application may determine a meshnet IP packet to be communicated with the second user device. The meshnet IP packet may indicate the meshnet IP address associated with the second user device as a destination address. To determine the destination address, the communication application may issue a query to the first client application for the meshnet IP address associated with the second user device. The query may be resolved by a domain name server (DNS) service native to the first client application by referring to the first meshnet IP address map. In some aspects, the DNS service may resolve the query by referring to the first meshnet IP address map and returning the meshnet IP address (e.g., the original second meshnet IP address) associated with the second user device. Based at least in part on receiving the original second meshnet IP address, the communication application may determine the meshnet IP packet.

As discussed previously, the original second meshnet IP address may be a temporarily assigned meshnet IP address. In this case, when the second user device leaves the mesh network, the MSP control infrastructure 104 may disassociate the original second meshnet IP address (e.g., previously assigned meshnet IP address) from the second user device such that the original second meshnet IP address is available for reassignment to another user device. Further, when the second user device rejoins the mesh network, the MSP control infrastructure 104 may assign a new second meshnet IP address (e.g., currently assigned meshnet IP address) to the second user device.

Based at least in part on determining that the second user device has rejoined the mesh network, the first user device may transmit a request to the MSP control infrastructure 104 for communication information that indicates the new second meshnet IP address. In some aspects, the first user device may determine that the second user device has rejoined the mesh network based at least in part on determining a connection or reconnection of the meshnet connection between the first user device and the second user device. Based at least in part on receiving the communication information, the first client application may update the first meshnet IP address map to update the association of the second user device with the new second meshnet IP address.

Additionally, or alternatively, the first client application may receive communication information without transmitting the request to the MSP control infrastructure 104. In an example, the MSP control infrastructure 104 may monitor operation of the mesh network. In some aspects, the MSP control infrastructure 104 may determine whether a given user device included in the mesh network has left the mesh network and/or an external user device outside the mesh network is to be included in the mesh network. When the MSP control infrastructure 104 determines that the given user device included in the mesh network has left the mesh network, the MSP control infrastructure 104 may disassociate a meshnet IP address associated with the given user device such that the meshnet IP address may be available for reassignment. Further, when the MSP control structure 104 determines that the external user device is to be included in the mesh network, the MSP control infrastructure 104 may assign a meshnet IP address to the external user device.

Based at least in part on determining that the external user device is to be included in the mesh network and/or based at least in part on assigning the meshnet IP address to the external user device, the MSP control infrastructure 104 may determine and transmit communication information to the first user device. The communication may indicate an association of the external user device with the assigned meshnet IP address. Based at least in part on receiving the communication information, the first client application may update the first meshnet IP address map to include the association of the external user device with a assigned meshnet IP address. When the external user device joins or rejoins the mesh network, the first user device may utilize the assigned meshnet IP address to communicate with the external user device.

As a result, an issued query to the first client application for the meshnet IP address associated with a user device may be resolved by the DNS service by referring to the updated first meshnet IP address map. In an example, the DNS service may resolve the query by referring to the first meshnet IP address map and returning the new second meshnet IP address associated with the second user device. Based at least in part on receiving the new second meshnet IP address, the communication application may determine the meshnet IP packet indicating the new second meshnet IP address as the destination address. Because the new second meshnet IP address is the current meshnet IP address associated with the second user device, the second client application may accept and process the meshnet IP packet transmitted by the first user device and received by the second user device.

In this way, the first user device may utilize the currently assigned meshnet IP address to communicate with the second user device, and communication between the first user device and the second user device may continue uninterrupted. Further, instances of inefficient transmissions and retransmissions of communications by the first user device (and other endpoints in the mesh network) to the second user device may be mitigated. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the mesh network.

In some aspects, the other user devices (e.g., second user device, third user device, fourth user device, etc.) included in the mesh network may update respective meshnet IP address maps in a similar and/or analogous manner as discussed herein with respect to the first user device. For instance, the other user devices in the mesh network may, among other things, receive communication information and update respective meshnet IP address maps, as discussed herein. Additional user devices that enter the mesh network may also update respective meshnet IP address maps, as discussed herein.

As indicated above, FIG. 3 is provided as an example. Other examples may differ from what is described with regard to FIG. 3.

FIG. 4 is an illustration of an example process 400 associated with updating meshnet IP maps in a mesh network, according to various aspects of the present disclosure. In some aspects, the process 400 may be performed by a memory and/or a processor/controller (e.g., processing unit 116, processor 720) associated with a user device/endpoint (e.g., user device 102) running a client application. As shown by reference numeral 410, process 400 may include determining, by a first device in a mesh network, that a second device has joined the mesh network. For instance, a first device may utilize the associated memory and/or processor to determine, while in communication with a second device in a mesh network, that a second device has joined the mesh network, as discussed elsewhere herein.

As shown by reference numeral 420, process 400 may include transmitting, by the first device based at least in part on determining that the second device has joined the mesh network, a request to receive communication information indicating a meshnet address associated with the second device. For instance, the first device may utilize an associated communication interface (e.g., communication interface 770) with the associated memory and/or processor to transmit, based at least in part on determining that the second device has joined the mesh network, a request to receive communication information indicating a meshnet address associated with the second device, as discussed elsewhere herein.

As shown by reference numeral 430, process 400 may include updating, by the first device based at least in part on receiving the meshnet address, a meshnet address map to indicate an association of the second device with the meshnet address. For instance, a first device may utilize the associated memory and/or processor to update, based at least in part on receiving the meshnet address, a meshnet address map to indicate an association of the second device with the meshnet address, as discussed elsewhere herein.

As shown by reference numeral 440, process 400 may include transmitting, by the first device based at least in part on updating the meshnet address map, meshnet data to the second device utilizing the updated meshnet address map. For instance, the first device may utilize the associated communication interface, memory, and/or processor to transmit, based at least in part on updating the meshnet address map, meshnet data to the second device utilizing the updated meshnet address map, as discussed elsewhere herein.

Process 400 may include additional aspects, such as any single aspect or any combination of aspects described below and/or in connection with one or more other processes described elsewhere herein.

In a first aspect, in process 400, determining that the second device has joined the mesh network includes determining that a meshnet connection between the first device and the second device is connected.

In a second aspect, alone or in combination with the first aspect, in process 400, transmitting the request to receive the communication information includes transmitting the request to an infrastructure device associated with the mesh network.

In a third aspect, alone or in combination with the first through second aspects, in process 400, updating the meshnet address map includes storing the association of the second user device with the meshnet address in a memory associated with the first device.

In a fourth aspect, alone or in combination with the first through third aspects, in process 400, updating the meshnet address map includes replacing an association of the second device with a previous meshnet address with the association of the second device with the meshnet address.

In a fifth aspect, alone or in combination with the first through fourth aspects, in process 400, transmitting the meshnet data includes transmitting a meshnet packet including the meshnet data, the meshnet packet indicating the meshnet address as a destination address.

In a sixth aspect, alone or in combination with the first through fifth aspects, in process 400, transmitting the meshnet data includes transmitting encrypted meshnet data.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with updating meshnet IP maps in a mesh network, according to various aspects of the present disclosure. In some aspects, the process 500 may be performed by a memory and/or a processor/controller (e.g., processing unit 116, processor 720) associated with a user device/endpoint (e.g., user device 102) running a client application. As shown by reference numeral 510, process 500 may include receiving, by a first device in communication with a second device in a mesh network, communication information indicating a meshnet address associated with the second device to be utilized for communicating meshnet data with the second device. For instance, the user device (e.g., first user device) may utilize a communication interface (e.g., communication interface 770) with the associated memory and/or processor to receive, while in communication with a second device in a mesh network, communication information indicating a meshnet address associated with the second device to be utilized for communicating meshnet data with the second device, as discussed elsewhere herein.

As shown by reference numeral 520, process 500 may include updating, by the first device, a meshnet address map to indicate an association of the second user device with the meshnet address. For instance, the user device may utilize the associated communication interface, memory, and/or processor to update a meshnet address map to indicate an association of the second user device with the meshnet address, as discussed elsewhere herein.

Process 500 may include additional aspects, such as any single aspect or any combination of aspects described below and/or in connection with one or more other processes described elsewhere herein.

In a first aspect, in process 500, receiving the communication information includes receiving the communication information based at least in part on the second device joining the mesh network.

In a second aspect, alone or in combination with the first aspect, in process 500, receiving the communication information includes receiving the communication information from an infrastructure device associated with the mesh network.

In a third aspect, alone or in combination with the first through second aspects, in process 500, receiving the communication information includes receiving the communication information without transmitting a request to receive the communication information.

In a fourth aspect, alone or in combination with the first through third aspects, in process 500, updating the meshnet address map includes storing the association of the second device with the meshnet address in a memory associated with the first device.

In a fifth aspect, alone or in combination with the first through fourth aspects, process 500 may include transmitting, by the first device based at least in part on updating the meshnet address map, meshnet data to the second device utilizing the updated meshnet address map.

In a sixth aspect, alone or in combination with the first through fifth aspects, process 500 may include resolving, by the first device, a query for information associated with the meshnet address by referring to the meshnet address map utilizing a local domain name system (DNS).

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with updating meshnet IP maps in a mesh network, according to various aspects of the present disclosure. In some aspects, the process 600 may be performed by a memory and/or a processor/controller (e.g., processing unit 110, processor 720) associated with an infrastructure device MSP control infrastructure 104 (e.g., user device 102). As shown by reference numeral 610, process 600 may include determining, by an infrastructure device associated with a mesh network that includes a first device, that a second device has joined the mesh network. For instance, the infrastructure device may utilize the associated memory and/or processor to determine, based at least in part on being associated with a mesh network that includes a first device, that a second device has joined the mesh network, as discussed elsewhere herein.

As shown by reference numeral 620, process 600 may include transmitting, by the infrastructure device to the first device based at least in part on determining that the second device has joined the mesh network, communication information indicating a meshnet address associated with the second device to enable the first device to update a meshnet address map to indicate an association of the second device with the meshnet address. For instance, the infrastructure device may utilize an associated communication interface (e.g., communication interface 770) along with the associated memory and/or processor to transmit, to the first device based at least in part on determining that the second device has joined the mesh network, communication information indicating a meshnet address associated with the second device to enable the first device to update a meshnet address map to indicate an association of the second device with the meshnet address, as discussed elsewhere herein.

Process 600 may include additional aspects, such as any single aspect or any combination of aspects described below and/or in connection with one or more other processes described elsewhere herein.

In a first aspect, in process 600, determining that the second device has joined the mesh network includes determining that the second device is to be included in the mesh network.

In a second aspect, alone or in combination with the first aspect, process 600 may include determining the meshnet address to be utilized by the second device for communicating meshnet data in the mesh network.

In a third aspect, alone or in combination with the first through second aspects, process 600 may include receiving, from the first device, a request to transmit the communication information indicating the meshnet address associated with the second device.

In a fourth aspect, alone or in combination with the first through third aspects, process 600 may include transmitting the communication information to the second device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with updating meshnet IP maps in a mesh network, according to various aspects of the present disclosure. In some aspects, the example devices 700 may form part of or implement the systems, servers, environments, infrastructures, components, devices, or the like described elsewhere herein (e.g., MSP control infrastructure, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first client device from an infrastructure device for communication with a second client device in a mesh network, communication information indicating a meshnet internet protocol (IP) address that is assigned to the second client device for communicating meshnet data in the mesh network, the communication information being received without transmitting a request to the infrastructure device to receive the communication information; and
   updating, by the first client device, a meshnet address map to indicate an association of the second client device with the meshnet IP address, wherein updating the meshnet address map includes storing the association of the second client device with the meshnet IP address in a memory of the first client device.

2. The method of claim 1, wherein receiving the communication information includes receiving the communication information at a time associated with the second client device joining the mesh network.

3. The method of claim 1, wherein receiving the communication information includes receiving the communication information from an infrastructure device associated with the mesh network.

4. The method of claim 1, wherein the first client device is in direct communication with the second client device in the mesh network via a meshnet connection between the first client device and the second client device.

5. The method of claim 1, wherein the meshnet data is communicated via a meshnet connection between the first client device and the second client device, the meshnet connection being connected based at least in part on negotiating a cryptographic key for encrypted communication of the meshnet data.

6. The method of claim 1, further comprising:
   transmitting, by the first client device based at least in part on updating the meshnet address map, meshnet data to the second client device utilizing the updated meshnet address map.

7. The method of claim 1, further comprising:
   resolving, by the first client device, a query for information associated with the meshnet IP address by referring to the meshnet address map utilizing a local domain name system (DNS).

8. A first client device, comprising:
   a memory; and
   a processor communicatively coupled to the memory, the memory and the processor being configured to:
      receive, from an infrastructure device for communication with a second client device in a mesh network, communication information indicating a meshnet internet protocol (IP) address that is assigned to the second client device for communicating meshnet data in the mesh network, the communication information being received without transmitting a request to the infrastructure device to receive the communication information; and
      update a meshnet address map to indicate an association of the second client device with the meshnet IP address, wherein, to update the meshnet address map, the memory and the processor are configured to store the association of the second client device with the meshnet IP address in a memory of the first client device.

9. The first client device of claim 8, wherein, to receive the communication information, the memory and the processor are configured to receive the communication information at a time associated with the second client device joining the mesh network.

10. The first client device of claim 8, wherein, to receive the communication information, the memory and the processor are configured to receive the communication information from an infrastructure device associated with the mesh network.

11. The first client device of claim 8, wherein the first client device is in direct communication with the second client device in the mesh network via a meshnet connection between the first client device and the second client device.

12. The first client device of claim 8, wherein the meshnet data is communicated via a meshnet connection between the first client device and the second client device, the meshnet connection being connected based at least in part on negotiating a cryptographic key for encrypted communication of the meshnet data.

13. The first client device of claim 8, wherein the memory and the processor are configured to:
transmit, based at least in part on updating the meshnet address map, meshnet data to the second client device utilizing the updated meshnet address map.

14. The first client device of claim 8, wherein the memory and the processor are configured to:
resolve a query for information associated with the meshnet IP address by referring to the meshnet address map utilizing a local domain name system (DNS).

15. A non-transitory computer-readable medium configured to store instructions, which when executed by a processor associated with a first client device, configure the processor to:
receive, from an infrastructure device for communication with a second client device in a mesh network, communication information indicating a meshnet internet protocol (IP) address that is assigned to the second client device for communicating meshnet data in the mesh network, the communication information being received without transmitting a request to the infrastructure device to receive the communication information; and
update a meshnet address map to indicate an association of the second client device with the meshnet IP address, wherein, to update the meshnet address map, the processor is configured to store the association of the second client device with the meshnet IP address in a memory of the first client device.

16. The non-transitory computer-readable medium of claim 15, wherein, to receive the communication information, the processor is configured to receive the communication information at a time associated with the second client device joining the mesh network.

17. The non-transitory computer-readable medium of claim 15, wherein, to receive the communication information, the processor is configured to receive the communication information from an infrastructure device associated with the mesh network.

18. The non-transitory computer-readable medium of claim 15, wherein the first client device is in direct communication with the second client device in the mesh network via a meshnet connection between the first client device and the second client device.

19. The non-transitory computer-readable medium of claim 15, wherein the meshnet data is communicated via a meshnet connection between the first client device and the second client device, the meshnet connection being connected based at least in part on negotiating a cryptographic key for encrypted communication of the meshnet data.

20. The non-transitory computer-readable medium of claim 15, wherein the processor is configured to:
transmit, based at least in part on updating the meshnet address map, meshnet data to the second client device utilizing the updated meshnet address map.

* * * * *